3,496,231
BIS-(DIAMINOMETHYL-PHOSPHINES)
Ludwig Maier, Zurich, Switzerland, assignor to Monsanto Company, St. Louis, Mo., a corporation of Delaware
No Drawing. Filed Feb. 28, 1966, Ser. No. 530,405
Claims priority, application Switzerland, Mar. 4, 1965, 3,016/65
Int. Cl. C07f 9/50; C08k 1/60; C10l 1/26
U.S. Cl. 260—583                                6 Claims

ABSTRACT OF THE DISCLOSURE

Bis-(diaminomethyl-phosphines) of the formula

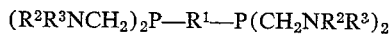

and process for making by reacting a diphosphine of the formula $H_2P$—$R^1$—$PH_2$ with formaldehyde and a secondary amine in aqueous solution and/or in an organic solvent.

---

It is well-know that phosphine, primary and secondary phosphines react with tertiary methylolamines prepared from formaldehyde and secondary amines, giving the corresponding aminomethyl substituted tertiary phosphines.

The present invention is concerned with a process for preparing novel bis-(diaminomethyl-phosphines) of the general formula

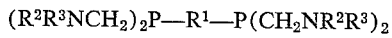

wherein $R^1$ is a possibly halogenated alkylene, cycloalkylene, aralkylene, alkarylene or arylene group and $R^2$ and $R^3$ are identical or different, possibly olefinically or acetylenically unsaturated alkyl, cycloalkyl, aralkl, alkaryl, aryl groups, or taken together with the nitrogen atom a heterocyclic group; i.e. $R^1$ are hydrocarbylene or halogenated hydrocarbylene groups, which for some purposes have not more than 8 carbon atoms, the alkylene groups being especially desirable and those groups not having olefinic or acetylenic (aliphatic) unsaturation; for the $R^2$ and $R^3$ groups the hydrocarbyl groups, which for some purposes have not more than 8 carbon atoms and especially alkyl groups. Normally $R^1$, $R^2$ and $R^3$ groups having not more than 24 carbon atoms are desirable.

Bis-(diaminomethyl-phosphines) have hitherto not been known. It has been found that these compounds are obtained by reacting a diphosphine with formaldehyde and a secondary amine according to the equation

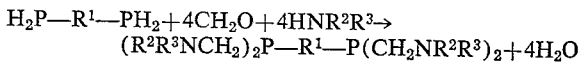

A method for making diphosphine reactants is described in copending application Ser. No. 529,245, filed Feb. 23, 1966.

Suitable groups are the divalent groups which are derived from the same saturated hydrocarbons as are enumerated below in the form of monovalent groups for $R^2$ and $R^3$. One or several hydrogen atoms of these groups can be replaced by halogen atoms, especially chlorine or fluorine atoms. Examples of some simple starting products are methylene - diphosphine, chloromethylene-diphosphine, dichloromethylene - diphosphine, difluoromethylene - diphosphine, ethylene - 1,2-diphosphine, tetrafluoroethylene - 1,2 - diphosphine, ethylene - 1,1-diphosphine, 2,2 - difluoroethylene - 1,1-diphosphine, propylene-1,3 - diphosphine, propylene - 1,2 - diphosphine, isopropylene - diphosphine, butylene - 1,3-diphosphine, butylene-1, 4 - diphosphine, butylene - 1,3 - diphosphine, butylene-1,2- diphosphine, isobutylene - diphosphine, t-butylene-diphosphine, cyclopentylene - 1,3 - diphosphine, cyclopentylene-1,2 - diphosphine, cyclohexylene - 1,2-diphosphine, cyclohexylene - 1,3 - diphosphine, cyclohexylene - 1,4-diphosphine, phenylene - 1,2 - diphosphine, phenylene - 1,3-diphosphine, phenylene - 1,4 - diphosphine, phenylene-1,3-diphosphine, phenylene-1,4 - diphosphine, tetrafluorophenylene - 1,4 - diphosphine, phenylethylene-1,2-diphosphine, diphenylmethylene - diphosphine and durylenediphosphine.

Examples of $R^2$ and $R^3$ are alkyls, alkenyls and alkynyls like methyl, ethyl, n-propyl, iso-propyl, allyl, propargyl, n-butyl, iso-butyl, sec-butyl, tert-butyl, methallyl, crotyl, 2-butynyl and higher aliphatic groups having up to 24 carbon atoms like undecenyl, dodecyl, myristyl, oleyl, tetracosyl; moreover cycloalkyls and cycloalkenyls like cyclopentyl, cyclopentadienyl, cyclohexyl, cyclohexenyl, cyclohexadienyl and greater alicyclic groups having up to 12 carbon atoms like cyclooctyl, cyclooctatrienyl, cyclododecyl, cyclododecatrienyl, bicyclohexyl; moreover aralkyls, aralkenyls and aralkynyls like benzyl, cuminyl, phenylethyl, phenylpropyl, 3-phenylallyl, 2-phenylallyl, cinnamyl, diphenylmethyl, triphenylmethyl, 1-naphthylmethyl, 2 - naphthylmethyl, 1 - naphthylethyl, 2-naphthylethyl; moreover alkaryls, alkenylaryls and alkynylaryls like tolyl, xylyl, mesityl, duryl, ethylphenyl, cumyl, vinylphenyl, ethynylphenyl, propargylphenyl, propynylphenyl, tert - butylphenyl, 1 - vinylnaphthyl, 2 - vinylnaphthyl, 1-ethynylnaphthyl, 2 - ethynylnaphthyl; moreover aryls like phenyl, o-biphenylyl, m - biphenylyl, p - biphenylyl, o-terphenylyl, m - terphenylyl, p - terphenylyl, 1-naphthyl, 2 - naphthyl, 2 - anthryl, 9 - anthryl, 1 - phenanthryl, 2-phenanthryl, 3-phenanthryl, 4-phenanthryl, 9-phenanthryl.

From the structural formula shown above it becomes apparent that the group $R^2R^3N$ represents the radical of a secondary amine and consequently may contain also a combination of the enumerated hydrocarbon groups, including the groups which are derived from a secondary heterocyclic amine such as ethylenimine, propylenimine, pyrrole, pyrroline, pyrrolidine, pyrazole, pyrazoline, N-methylpyrazolidine, imidazole, imidazoline, N-ethylimidazolidine, thiazolidine, oxazolidine, triazole, piperidine, N-dodecylpiperazine, morpholine, thiazine, indole, and carbazole.

In carrying out the process an organic primary bisphosphine is brought to reaction with formaldehyde and a secondary amine preferably in a molar ratio of at least 1:4:4 in a suitable solvent.

Suitable solvents are water, methyl alcohol, ethyl alcohol, isopropyl alcohol, acetonitrile, dioxane, dimethylacetamide, dimethylsulfone, dimethylsulfoxide, sulfolane, tetrahydrofurane, hexane, benzene and toluene. The formaldehyde may be used in the form of a commercial aqueous mixture or paraformaldehyde. The reaction medium may also consist of two layers, the one being water and the other an organic solvent which is not miscible with water. In general, the reaction proceeds exothermally at room temperature. One can prepare at first the reaction product from formaldehyde and secondary amine and combine it preferably after purification with the organic bis-phosphine.

The novel compounds can be used as heat transferring liquids, oil and gasoline additives, textile agents, stabilizers, plasticizers, complexing agents, detergent additives and bactericides. Moreover, they are valuable intermediate products, since the amino groups can be exchanged for groups of other compounds like alcohols, phenols, phosphines, stannanes, mercaptans, malonic esters and other compounds having active hydrogen atoms. In such case the amino group is preferably derived from an easily volatile amine.

The organic bis-(di-aminomethyl-phosphines) can be converted into the corresponding oxides, sulfides and selenides in a manner which is known with other types of phosphorus compounds.

EXAMPLE 1

To a mixture of 27 g. of a 40% aqueous solution of formaldehyde and 25.6 g. of diethylamine are added 6 g. of methylene-diphosphine. The reaction is exothermic. After stirring at room temperature for 1 hour, the product is extracted with a light petroleum, the extracts dried with sodium sulfate and fractionally distilled. Yield 10 g. of methylene - bis - (di-diethylaminomethyl-phosphine); B.P.$_{0.001}$ 139–141° C. $n_D^{20}$ 1.5006, P$^{31}$ chemical shift +56.5 p.p.m.

*Analysis.*—$C_{21}H_{50}N_4P_2$: Calc'd percent: C, 59.96; H, 11.98; N, 13.32. Found, percent C, 59.50; H, 11.90; N, 13.49.

EXAMPLE 2

To a mixture of 39 g. of a 40% aqueous solution of formaldehyde and 37 g. of diethylamine are added 9.4 g. of ethylene-1,2-diphosphine. One then proceeds as in Example 1. Yield 40 g. (92.4%) of ethylene-1,2-bis-(di-diethylaminomethylphosphine); B.P.$_{0.001}$ 152–155° C., $n_D^{20}$ 1.5102,, P$^{31}$ chemical shift +48.7 p.p.m.

*Analysis.*—$C_{22}H_{52}N_4P_2$: Calc'd, percent: C, 60.79; H, 12.06; N, 12.89. Found, percent: C, 60.79; H, 12.16; N, 13.13.

EXAMPLE 3

To a mixture of 15 g. of a 40% aqueous solution of formaldehyde and 15 g. of diethylamine are added 3.7 g. of propylene-1,3-diphosphine. One then proceeds as in Example 1. Yield 12.5 g. (80%) of propylene-1,3-bis-(di-ethylaminomethyl-phosphine); B.P.$_{0.05}$ 180–181° C., $n_D^{20}$ 1.5018, P$^{31}$ chemical shift +53.8 p.p.m.

*Analysis.*—$C_{23}H_{54}N_4P_2$: Calc'd, percent: C, 61.57; H, 12.13; N, 12.49. Found, percent: C, 60.19; H, 12.21; N, 12.14.

EXAMPLE 4

To a mixture of 30 g. of a 40% aqueous solution of formaldehyde and 39 g. of diethylamine are added 7.0 g. of butylene-1,4-diphosphine. One then proceeds as in Example 1. Yield 16.5 g. (62.3%) of butylene-1,4-bis-(di-diethylaminemethyl-phosphine); B.P.$_{0.001}$ 190–193° C., $n_D^{20}$ 1.4990, P$^{31}$ chemical shift +53.2 p.p.m.

*Analysis.*—$C_{24}H_{56}N_4P_2$: Calc'd, percent: C, 62.30; H, 12.20; N, 12.11. Found, percent: C, 62.34; H, 12.06; N, 12.02.

The organic bis-(di-aminomethyl-phosphines) yield with cerain metal salts colored complexes, for example with butylene-1,4-bis-(di-diethylaminomethyl-phosphine) the nickel complex is red brown and the cobalt bromide complex is green. With, for example, ethylene-1,2-bis-(di-diethylaminomethyl-phosphine) the mercuric chloride complex is yellow.

What is claimed is:

1. A bis-(di-aminomethyl-phosphine) of the formula $$(R^2R^3NCH_2)_2P—R^1—P(CH_2NR^2R^3)_2$$

wherein R$^1$ is hydrocarbylene free of aliphatic unsaturation and having up to 24 carbon atoms, and R$^1$ and R$^2$ are each hydrocarbyl having up to 24 carbon atoms.

2. A bis-(di-aminomethyl-phosphine) of claim 1 wherein R$^1$ is alkylene having not more than 8 carbon atoms, and R$^2$ and R$^3$ are each alkyl having not more than 8 carbon atoms.

3. Methylene - bis - (di - diethylaminomethyl-phosphine).

4. Ethylene - 1,2 - bis - (di-diethylaminomethyl-phosphine).

5. Propylene - 1,3 - bis - (di-ethylaminomethyl-phosphine).

6. Butylene - 1,4 - bis - (di-diethylamine-methyl-phosphine).

References Cited

UNITED STATES PATENTS 3,037,978   6/1962   Coates _____ 260—583 X

CHARLES B. PARKER Primary Examiner.

R. L. RAYMOND, Assistant Examiner

U.S. Cl. X.R.

252—152; 260—239, 293, 307, 309.6, 309.7, 310, 326.8, 563, 570.9, 577, 606.5